United States Patent Office 3,826,785
Patented July 30, 1974

---

3,826,785
ANIONIC LACTAM POLYMERIZATION PROCESS USING AN O—C≡N CONTAINING ACTIVATOR
Philippe Bruant, Billere, France, assignor to Societe Anonyme dite: Aquitaine Total Organico, Courbevole, France
No Drawing. Filed June 26, 1972, Ser. No. 266,051
Int. Cl. C08g 20/18
U.S. Cl. 260—78 L    13 Claims

ABSTRACT OF THE DISCLOSURE

This invention concerns a process for the anionic polymerization of lactams, using a new category of activators which allow the speed of polymerization to be properly controlled.

---

This anionic lactam-polymerization process makes use of activators containing one or more cyanate functions.

These activators are particularly useful when polymerization is performed in a mould, or when lactams are polymerized in an organic solvent, in order to obtain the polymer in powder form.

This invention concerns a new anionic lactam-polymerization process.

It has for some time been the practice to prepare high molecular weight polyamides by polymerizing lactams, such as caprolactam, in the presence of alkaline catalysts such as sodium, sodium hydride, and sodium amidide, at temperatures of more than 220° C., namely above the melting point of the polymer. Industrial application of such methods has not been possible, however, since the products obtained show considerable heterogeneity in their viscosity, and even some features of cross-linked products or, in the case of polycaprolactam, too high a percentage of monomer lactam.

In addition, articles produced by *in situ* polymerization in moulds are unsatisfactory. Polymerization occurs at a temperature above the melting point of the polymer, with the result that shrinkage holes appear as the polyamide solidifies, and there are often internal stresses in the moulded product. In the case of polycaprolactam, elimination and recovery of the monomer in the moulded product is almost impossible.

Development of this process was made possible by the use of activators, which speed up the reaction and make less severe temperature conditions possible. Recommended activators include, in particular, isocyanates, acyl-lactams, acid chlorides, cyanamides, ureas, certain esters, lactim-ethers and substituted N-imides.

However, the activators used up till now are not usually suitable for all the types of polymerization involved: some, such as isocyanates, are in some cases over-active and too rapid; others, such as esters or substituted ureas are too slow.

It is consequently almost impossible to polymerize 12-lactam *in situ* in a mould using these activators. Isocyanates cannot be used, since the melting point of the monomer is 150° C., at which temperature polymerization occurs instantly in the presence of isocyanates. Obviously, under these circumstances homogenization is not possible. Ureas cannot be used either, since the melting point of 12-polyamide is 178° C., below which temperature polymerization in the presence of ureas is too slow; this means that polymerization has to be done above the melting point of the polymer, with all the drawbacks this involves: shrinkage holes during solidification, and internal stresses.

Furthermore, these substituted ureas or esters cannot be used for other applications, such as polymerization of lactams in an organic solvent, in order to obtain the polymer directly in powder form. When these activators are used large lumps tend to form in the mixture, or else the yield is slight, sometimes nil.

The present invention concerns anionic lactam polymerization with a new category of activators which can be used under all circumstances.

This new process consists of polymerizing lactam in the presence of a catalyst and an activator containing one or more cyanate functions to provide a high molecular weight polyamide.

The most suitable activators for use with this invention have the following two formulae:

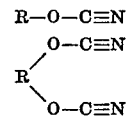

where R is a bivalent or monovalent organic radical, as the case may be, and in particular an aliphatic or aromatic radical. Such activators include phenylcyanate with the formula $C_6H_5$—O—C≡N, and ethyl cyanate.

These activators can be prepared fairly simply, for example by reaction between a phenol and a cyanogen halide.

The concentration of activator for this new process can vary very widely, depending on the viscosity to be obtained. It is usually between 0.05 and 5 moles per 100 moles of lactam, and preferably between 0.2 and 2 moles.

The anionic polymerization process according to the invention is suitable for all lactams, particularly those with from 4 to 12, and preferably 6 to 12, carbon atoms in the lactam ring. These include pyrrolidone, valerolactam, caprolactam, oenantholactam, capryl-lactam, and lauryl-lactam. Lactams substituted in the methylenic chain, such as methyl- or isopropyl-caprolactam, can also be used. Mixtures of lactams can also be polymerized, to obtain copolymers or even terpolymers, such as caprolactam and lauryl-lactam copolyamides.

Lactams can be polymerized in the presence of cyanates and any existing anionic polymerization catalyst, including compounds of alkaline or alkaline earth metals, aluminium, zinc or magnesium, such as lactamates, hydrides, amidides, alcoholates and alkyl compounds, and preferably sodium hydride, sodium lactamate, sodium amidide and sodium methylate.

The concentration of catalyst is usually between 0.1 and 5 moles per 100 moles of lactam, and preferably between 0.3 and 2 moles.

The process according to the invention can be performed with monomer in bulk or dissolved in an organic solvent, to obtain polymer in powder form.

In the case of bulk polymerization, the process is performed at a temperature above the melting point of the monomer lactam, but generally below the melting point of the polyamide. It can range from approximately 100 to 200° C., depending on the lactam, but is preferably between 140 and 180° C. The length of bulk polymerization obviously varies depending on reaction conditions, particularly the temperature and the type of lactam, but it is seldom more than 30 minutes, and usually less than 10 minutes.

In preparations for performing the process in bulk, the lactam can simply be mixed with the catalyst and cyanate; it is first melted, and the catalyst and activator are stirred in. The mixture is then heated to polymerization temperature. It is also possible to mix some of the molten lactam with the catalyst, and some with the activator, then mix both together, and heat the mixture to polymerization temperature.

Polymerization can be done in batch appliances, such as autoclaves, or in continuously operating appliances, such as heated tubes or extruding machines. It can also be performed in a mould, allowing manufactured articles of given size to be obtained, remembering that the dimensions of the polyamide will be smaller than those of the reaction enclosure.

Before bulk polymerization, various types of additives can be mixed with the lactam, such as strengthening materials like asbestos or glass fibre, stabilizers, colouring matter, pigments, lubricants like molybdenum sulphide, expansion agents, cross-linking agents or other fillers like carborundum or graphite.

Polymerization may also be performed in the presence of other polymers, such as polystyrene, polyethylene, polyacetals, polypropylene and polyamides.

Lactams can also be polymerized in the presence of inert solvents such as aliphatic or aromatic hydrocarbons or ethers, preferably xylene, cumene, dichlorobenzene, decaline, dodecane, hexane, cyclohexane, tetraline and petroleum ether.

Lactams in an organic solvent should be polymerized at a temperature below the melting point of the polyamide obtained and in certain cases below the melting point of the monomer. The length of polymerization varies depending on reaction conditions, particularly the temperature and type of lactam; however, since polymerization temperatures are generally lower than for bulk polymerization, the reaction takes longer, usually between 1 and 2 hours.

In the case of polymerization in a solvent, the activator should be added continuously during at least part of the reaction, until 20% of the monomer and preferably at least 60 to 80% has been converted into polyamide, after which the rest can be added in one lot. To prevent lumps from forming, it is advisable to perform polymerization in the presence of an organic or inorganic dispersal agent, such as polyamide powder or micronized silica.

This process produces powdered polyamide which is especially suitable for electrostatic coatings and the manufacture of binders for heat-plastic adhesives and lacquers.

The invention is illustrated by, without being in any way confined to, the following examples.

EXAMPLE 1

50 g. of caprolactam are placed in a dry tube, and the temperature is raised to 160° C. 2% moles of NaH are then added to form sodium lactamate, then 2% moles of phenyl cyanate. Polymerization is completed in 10 minutes.

EXAMPLE 2

50 g. of lauryl-lactam are placed in a dry tube, and the temperature is raised to 160° C. 1% moles of NaH are then added to form sodium lactamate, then 1% moles of phenyl cyanate. Polymerization is completed in 2 or 3 minutes.

EXAMPLE 3

350 cc. of dry dodecane and 200 g. of caprolactam are placed in a reactor. 2% moles of NaH are then added, and when the sodium lactamate has formed completely, the temperature is raised to 180° C., and 2% moles of phenyl cyanate dissolved in 100 cc. of dry dodecane are added gradually, over a period of one hour.

Polymerization is continued for 1½ hours more, after which the reactor is emptied, and the product filtered and dried.

This produces a fine 6-polyamide powder with a yield of approximately 80% and grain-size of approximately 20μ.

EXAMPLE 4

50 g. of caprolactam are placed in a dry tube, and the temperature is raised to 160° C. 1% moles of NaH are then added to form sodium lactamate, then 1% moles of ethyl cyanate. Polymerization is completed in approximately 15 minutes.

What is claimed is:

1. An anionic lactam-polymerization process for preparing a high molecular weight polyamide, where the lactam ring contains between 4 and 12 carbon atoms, in which process cyanates consisting of at least one cyanate function, O—C≡N, linked to an aliphatic or aromatic radical are used as activators.

2. The process of claim 1 wherein the activator is selected from the group consisting of:

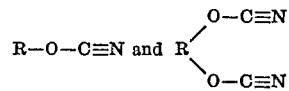

wherein R is an aliphatic or aromatic radical.

3. A process according to claim 2, in which the activator is phenyl cyanate.

4. A process according to claim 1, in which the concentration of activator is between 0.05 and 5 moles per 100 moles of lactam.

5. A process according to claim 4, in which the concentration of activator is between 0.2 and 2 moles per 100 moles of lactam.

6. A process according to claim 1, in which the lactam contains between 6 and 12 carbon atoms in the lactam-ring, such as at least one of the pair consisting of lauryl-lactam and caprolactam.

7. A process according to claim 1, in which polymerization occurs at between 140 and 180° C.

8. A process according to claim 1, in which polymerization occurs in bulk.

9. A process according to claim 8, in which polymerization occurs in a mould.

10. A process according to claim 1, in which polymerization occurs in an organic solvent.

11. A process according to claim 10, in which the activator is added gradually.

12. A process according to claim 1, in which polymerization occurs in the presence of a polymer.

13. A process according to claim 10, in which polymerization occurs in the presence of a dispersal agent.

References Cited

UNITED STATES PATENTS

| | | | |
|---|---|---|---|
| 3,015,652 | 1/1962 | Schnell et al. | 260—78 L |
| 3,228,916 | 1/1966 | Pietrusza et al. | 260—78 L |
| 3,376,369 | 4/1968 | Fisher | 260—78 L X |
| 3,415,792 | 12/1968 | Sebenda | 260—78 P |

LUCILLE M. PHYNES, Primary Examiner

U.S. Cl. X.R.

260—78 P, 857 R